(12) United States Patent
Ono et al.

(10) Patent No.: US 12,041,704 B2
(45) Date of Patent: Jul. 16, 2024

(54) SYNCHRONOUS CONTROL SYSTEM, TRANSMISSION DEVICE, RECEPTION DEVICE, SYNCHRONOUS CONTROL METHOD, AND SYNCHRONOUS CONTROL PROGRAM

(71) Applicant: Nippon Telegraph and Telephone Corporation, Tokyo (JP)

(72) Inventors: Masato Ono, Musashino (JP); Takahide Hoshide, Musashino (JP); Shinji Fukatsu, Musashino (JP); Yoshihide Tonomura, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 166 days.

(21) Appl. No.: 17/794,670

(22) PCT Filed: Jan. 27, 2020

(86) PCT No.: PCT/JP2020/002768
§ 371 (c)(1),
(2) Date: Jul. 22, 2022

(87) PCT Pub. No.: WO2021/152661
PCT Pub. Date: Aug. 5, 2021

(65) Prior Publication Data
US 2023/0095732 A1    Mar. 30, 2023

(51) Int. Cl.
*H05B 47/155*    (2020.01)
*H05B 47/175*    (2020.01)

(52) U.S. Cl.
CPC ......... *H05B 47/155* (2020.01); *H05B 47/175* (2020.01)

(58) Field of Classification Search
CPC .. H05B 47/155; H05B 47/175; H05B 47/184; H05B 47/165; H05B 47/18; Y02B 20/40; G06F 13/00
(Continued)

(56) References Cited

U.S. PATENT DOCUMENTS

2014/0167645 A1*  6/2014  Takahashi ............... H05B 45/20
                                                        315/297
2023/0095732 A1*  3/2023  Ono ......................... G06F 13/00
                                                        315/294

FOREIGN PATENT DOCUMENTS

| JP | 2007310777 | 11/2007 |
| JP | 2013026748 | 2/2013 |
| JP | 2014120396 | 6/2014 |

OTHER PUBLICATIONS

[No Author Listed] [online], "American National Standard E1.11-2004 USITT DMX512-A," ansi.org, Nov. 8, 2004, retrieved on Sep. 9, 2019, retrieved from URL <https://webstore.ansi.org/Standards/ESTA/ansie1112004>, 74 pages.
(Continued)

*Primary Examiner* — Ryan Jager
(74) *Attorney, Agent, or Firm* — Fish & Richardson P.C.

(57) ABSTRACT

A synchronous control system is provided. A transmission device 1 includes a reception unit 11 that receives a control signal for a lighting device in a live event site and a transmission unit 13 that transmits, to a reception device in a live viewing site, the control signal to which an output time is appended. The output time is obtained by adding a predetermined period of time to a receipt time at which the control signal is received. A reception device 2 includes a reception unit 21 that receives the control signal to which the output time is appended, and an output control unit 13 that outputs the control signal to a lighting device 6 in the live viewing site at the output time, and allows the control of the
(Continued)

lighting device 6 to synchronize with at least one of video and audio to be played in the live viewing site.

8 Claims, 7 Drawing Sheets

(58) Field of Classification Search
USPC .......................................................... 315/294
See application file for complete search history.

(56) References Cited

OTHER PUBLICATIONS

Imanaka, "LS on new ITU-T Recommendation H.430.4 on MMT profile on immersive live experience (ILE)," Telecommunication Standardization Sector, ITU-T SG16 meeting, Jan. 20-24, 2020, Wroclaw, Poland, 17 pages.

* cited by examiner

SYNCHRONOUS CONTROL SYSTEM, TRANSMISSION DEVICE, RECEPTION DEVICE, SYNCHRONOUS CONTROL METHOD, AND SYNCHRONOUS CONTROL PROGRAM

CROSS-REFERENCE TO RELATED APPLICATIONS

This application is a National Stage application under 35 U.S.C. § 371 of International Application No. PCT/JP2020/002768, having an International Filing Date of Jan. 27, 2020. The disclosure of the prior application is considered part of the disclosure of this application, and is incorporated in its entirety into this application.

TECHNICAL FIELD

The present invention relates to a synchronous control system, a transmission device, a reception device, a synchronous control method, and a synchronous control program.

BACKGROUND ART

Along with an increase in live viewing, a need has grown for live viewing giving a realistic feeling as added value. In order to produce the realistic feeling, it is considered to set the conditions of the lighting, illumination, and the like in the live viewing site to be the same as those in the live event site. Patent Literature 1 discloses the standard for controlling lighting and illumination.

CITATION LIST

Non-Patent Literature

Non-Patent Literature 1: "ANSI E1.11-2004 USITT DMX512-A", [Online], Internet <https://webstore.ansi.org/standards/esta/ansie1112004>

SUMMARY OF THE INVENTION

Technical Problem

In general, lighting control is performed to allow synchronization with the sound devices and the like in an environment of a limited size such as a live event site, and is not expected to be used to synchronize the video/sound with lighting in a remote site.

In order to realize synchronization of video/sound and lighting in a remote live viewing site, it is necessary to synchronize the timing of outputting a "video/audio signal" and a "lighting control signal" in the live viewing site as in the case of the live event site. However, due to the network delay caused in the network section from the live event site to the live viewing site and a difference in the signal processing time, it is difficult to synchronize the "video/audio signal" with the "lighting control signal".

The present invention has been made in view of the above-described situation. An object of the present invention is to provide a synchronous control system, a transmission device, a reception device, a synchronous control method, and a synchronous control program for synchronizing at least one of video and audio with lighting in the live viewing site as similar to the live event site.

Means for Solving the Problem

In order to achieve the object described above, one aspect of the present invention provides a synchronous control system including a transmission device and a reception device. The transmission device includes a reception unit that receives a control signal for a lighting device in a live event site and a transmission unit that adds, to the control signal, an output time obtained by adding a predetermined time to a receipt time at which the control signal is received and transmits the control signal to the reception device in a live viewing site. The reception device includes a reception unit that receives the control signal to which the output time is appended and an output control unit that outputs the control signal to a lighting device in the live viewing site at the output time and allows control of the lighting device to synchronize with at least one of video and audio to be played in the live viewing site.

One aspect of the present invention provides a transmission device in a synchronous control system having the transmission device in a live event site and a reception device in a live viewing site. The transmission device includes a reception unit that receives a control signal for a lighting device in the live event site and a transmission unit that adds, to the control signal, an output time obtained by adding a predetermined time to a receipt time at which the control signal is received and transmits the control signal to the reception device in the live viewing site.

One aspect of the present invention provides a reception device in a synchronous control system having a transmission device in a live event site and the reception device in a live viewing site. The reception device includes a reception unit that receives a control signal, to which an output time is appended, transmitted by the transmission device. The output time is obtained by adding a predetermined period of time to a receipt time of the control signal for the lighting device in the live event site. The reception device also includes an output control unit that outputs the control signal to a lighting device in the live viewing site at the output time and allows control of the lighting device to synchronize with at least one of video and audio to be played in the live viewing site.

One aspect of the present invention provides a synchronous control method to be performed by a synchronous control system having a transmission device and a reception device. The method includes, by the transmission device, a reception step of receiving a control signal for a lighting device in a live event site and a transmission step of transmitting, to the reception device in a live viewing site, the control signal to which an output time is appended. The output time is obtained by adding a predetermined period of time to a receipt time at which the control signal is received. The method also includes, by the reception device, a reception step of receiving the control signal to which the output time is appended and an output control step of outputting the control signal to a lighting device in the live viewing site at the output time and allowing control of the lighting device to synchronize with at least one of video and audio to be played in the live viewing site.

One aspect of the present invention provides a synchronous control program for causing a computer to function as the transmission device.

One aspect of the present invention provides a synchronous control program for causing a computer to function as the reception device.

Effects of the Invention

According to the present invention, it is possible to provide a synchronous control system, a transmission device, a reception device, a synchronous control method, and a synchronous control program for synchronizing at least one of video and audio with lighting in a live viewing site as similar to a live event site.

DESCRIPTION OF EMBODIMENTS

Hereinafter, an embodiment of the present invention will be described with reference to the drawings.

Figure 1:
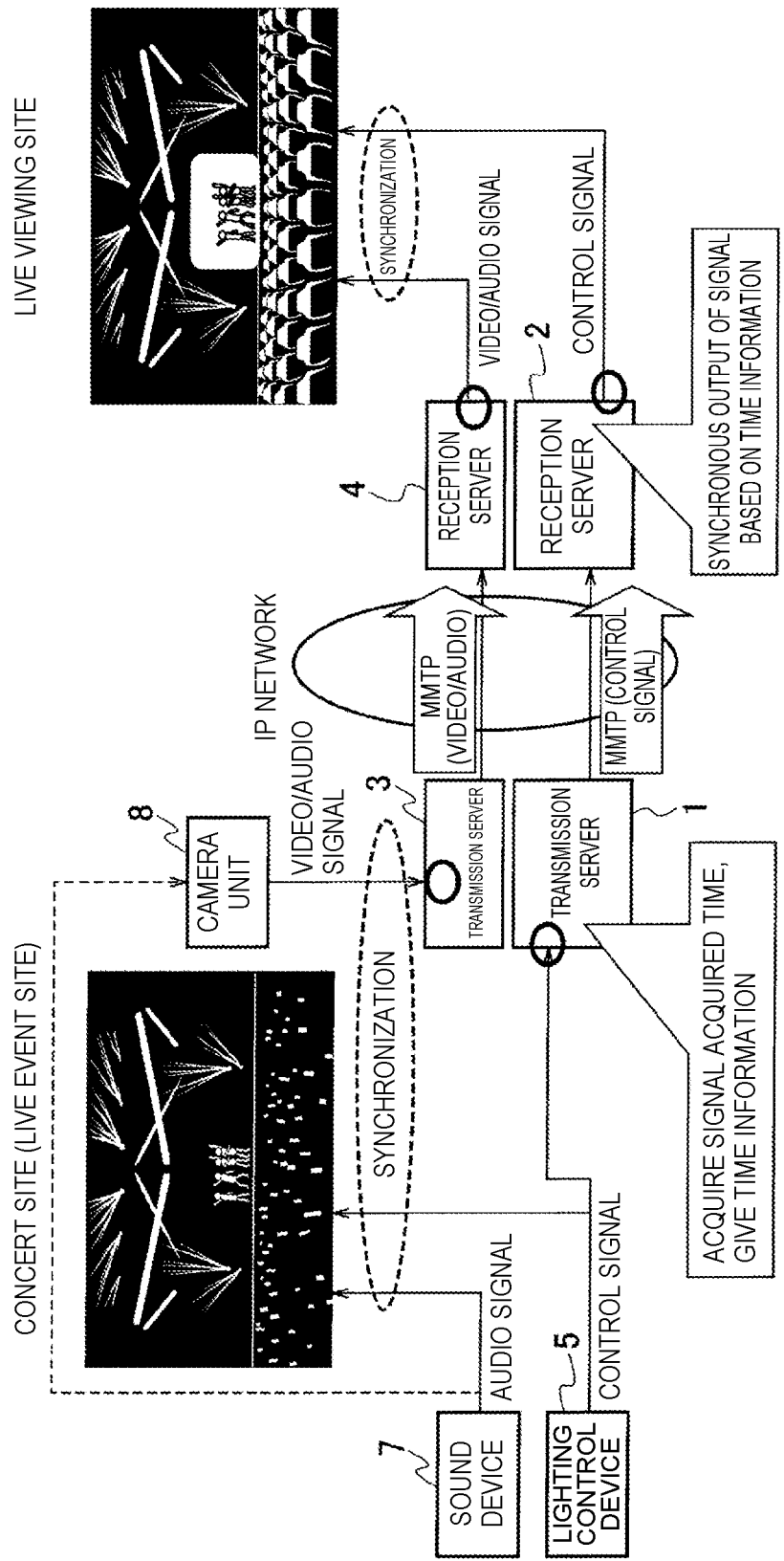
FIG. 1 is a perspective view illustrating the outline of a synchronous control system of an embodiment of the present invention.

FIG. 1 is a perspective view illustrating the outline of a synchronous control system of a present embodiment. In the present embodiment, information of the live event site other than video and audio is also transmitted to a remote live viewing site. Accordingly, live viewing giving a higher realistic feeling is realized.

Specifically, in order to feel the atmosphere of the live event site other than video and audio at the remote site, the presentation conditions such as lighting and illumination are set to be the same as those in the live event site. Therefore, a control signal for lighting and the like is output in the live viewing site in synchronization with the video and the audio. Note that while a lighting device and an illumination device are used as presentation devices for allowing synchronization with the video in the present embodiment, a device other than those may be synchronized with the video.

Moreover, while the lighting and the like are synchronized with the video and the audio in the present embodiment, the lighting and the like may be synchronized with either the video or the audio. That is, the lighting and the like are controlled so as to be synchronized with at least one of the video and the audio.

In live viewing, live video of an event of various types such as concerts, plays, and sports is presented to the audiences from the live event site where such an event takes place to a remote showing site. Here, description will be given by using a concert site as an example of a live event site.

In the synchronous control system illustrated, in the concert site, an audio signal of a sound device 7 is output in the concert site and is input to a camera unit 8. The camera unit 8 is configured such that the audio signal output from the sound device 7 is input to a microphone provided to the camera unit 8, and the camera unit 8 superimposes a video signal capturing the concert site and the audio signal and outputs the superimposed signal as one video and audio signal. Note that the camera unit 8 includes a device for superimposing a video signal and an audio signal, a device for separating an audio signal, and the like.

After a transmission server 3 for a video and audio signal receives a video and audio signal, the transmission server 3 acquires the receipt time at which the signal is received, and calculates an output time obtained by adding an offset time (a predetermined time) to the receipt time. Then, the transmission server 3 transmits the video and audio signal to which the output time is appended to a reception server 4 in the live viewing site. In the present embodiment, a signal is transmitted and received using a MPEG Media Transport (MMT) protocol via an IP network.

Further, in the concert site, a lighting control device 5 transmits a control signal for controlling the lighting device (not illustrated) in the concert site to the lighting device and also transmits the control signal to the transmission server 1. The control signal is a signal for controlling the lighting device so as to allow it to synchronize with the content of the concert, the sound device, and the like in the concert site. Accordingly, in the concert site, the content of the concert, the sound device, and the lighting device are synchronized with one another and expression is made.

After the transmission server 1 for a control signal receives the control signal, the transmission server 1 acquires the receipt time at which the control signal is received, and calculates an output time obtained by adding an offset time (a predetermined time) to the receipt time. The offset time will be described later.

In the live viewing site, the reception server 4 receives the video and audio signal to which the output time is appended and outputs the video and audio signal to a presentation system device (not illustrate) in the live viewing site at the output time. The presentation system device is a device that outputs (plays) the video and audio signal in the live viewing site. Specifically, the presentation system device shows the video of a video and audio signal on a display and outputs the audio. Further, the reception server 2 receives the control signal to which the output time is appended, and transmits the control signal to the lighting device in the live viewing site at the output time. The lighting device operates the lighting according to the control signal.

Accordingly, in the live viewing site, the video and audio and the lighting are expressed (presented) in synchronization with each other as similar to the concert site.

That is, in the present embodiment, in a state where time synchronization is made in the entire system, in the concert site, the transmission server 3 appends, to the video and audio signal, the output time obtained by adding the offset time to the receipt time at which the video and audio signal is acquired. Then, the transmission server 3 transmits the video and audio signal to the live viewing site by using the MMT protocol. Similarly, the transmission server 1 appends, to the control signal, the output time obtained by adding the offset time to the receipt time at which the control signal is acquired, and then transmits the control signal to the live viewing site by using the MMT protocol.

In the live viewing site, the reception server 4 outputs the video and audio signal by using the output time and the reception server 2 outputs the control signal by using the output time. The transmission servers 1 and 3 in the concert site append the output time to which the offset time of the same value is added to the receipt time of the signals, and the reception servers 2 and 4 in the live viewing site output the signals at the output time. Accordingly, the video and audio signal and the control signal that are acquired at a certain time in the concert site are output in the live viewing site at the timing when the offset time elapses from the receipt time. Accordingly, the present embodiment enables synchronous expression of the video and audio and the lighting in the live viewing site as similar to that in the concert site, even if there is a difference in the network delay between the video and audio signal and the control signal, a difference in the signal processing delay, or the like.

Figure 2:
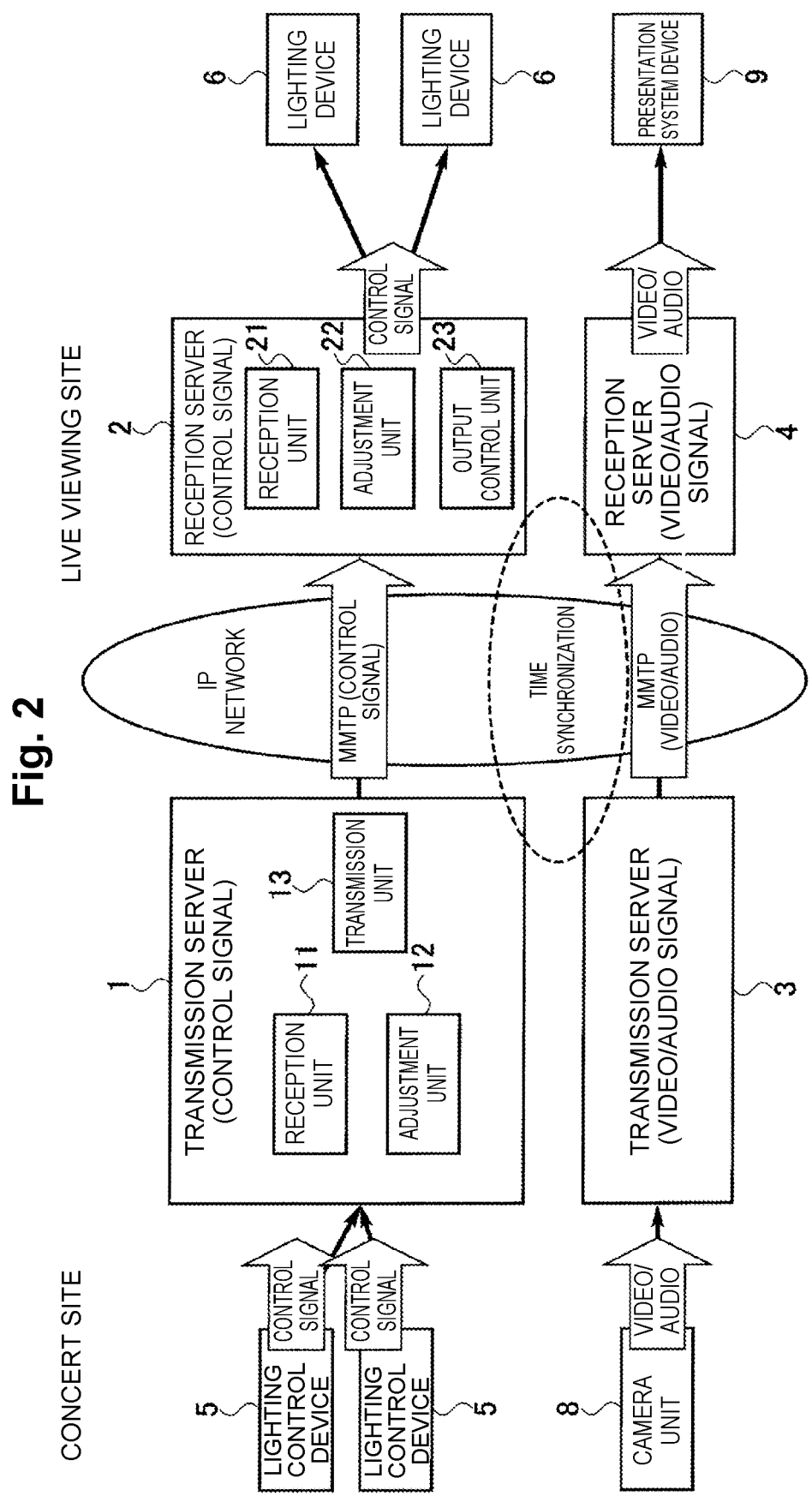
FIG. 2 is a system configuration diagram of the synchronous control system of the present embodiment.

FIG. 2 is a system configuration diagram illustrating the details of the synchronous control system of the present embodiment. The present system transmits a control signal and a video and audio signal via the IP network by using the MMT protocol, from the concert site to the live viewing site.

Further, in the present system, the time inside the system is synchronized by means of a Network Time Protocol (NTP) server or the like, and the same time system is used for the acquisition time and the output time of a signal. That is, the present embodiment is in a state where the time synchronization is made in the entire system.

The synchronous control system includes the transmission server 1 and the reception server 2 that transmit and receive control signals. The transmission server 1 is provided to the concert site (live event site) and the reception server 2 is provided to the live viewing site.

The transmission server 1 illustrated includes a reception unit 11, an adjustment unit 12, and a transmission unit 13. The reception unit 11 receives a control signal for controlling the lighting device provided in the event site from the lighting control device 5. The lighting device also includes an illumination device and the lighting includes illumination. The number of lighting control device 5 may be one or more. A control signal includes color information of the lighting, ON/OFF information of the lighting, control information of the moving light, and the like.

The adjustment unit 12 may adjust the control signal received by the reception unit 11 in order to enhance the realistic feeling in the live viewing site. To realize live viewing, the cases described below are assumed.

The number of live viewing site is not only one.
Configuration of the lighting device in the live viewing site is not the same as that in the concert site (machinery is different, some devices are not provided, or the like).
Size of the live viewing site, arrangement of the lighting devices, and the like are not the same as those in the concert site.

In the cases as described above, if a control signal is simply transmitted as it is, the lighting control similar to that of the concert site may not be performed, which may reduce the realistic feeling. Therefore, in the present embodiment, at least one of the adjustment unit 12 of the transmission server 1 and the adjustment unit 22 of the reception server 2 may adjust the control signal in the live viewing site in order to enhance the realistic feeling more efficiently.

For example, the adjustment unit 12 may discard a control signal for a lighting device not existing in the live viewing site. That is, the adjustment unit 12 may filter a control signal to be transmitted. Specifically, the transmission server 1 transmits a control signal for a lighting device provided in the live viewing site or a control signal only for a lighting device included in a request from the live viewing site to thereby prevent transmission of an unnecessary control signal.

The transmission unit 13 calculates the output time obtained by adding an offset time (a predetermined period of time) to the receipt time at which the reception unit 11 has received a control signal, appends the output time to the control signal, and then transmits the control signal to the reception server 2 of the live viewing site.

The offset time is set in consideration of the elements as described below.

Processing delay time of the transmission server 1 and the reception server 2 that transmit and receive control signals
Network delay in a control signal
Processing delay time of the transmission server 3 and the reception server 4 that transmit and receive a video and audio signal to be synchronized
Network delay in a video and audio signal to be synchronized For example, an image thereof is as follows: a period of time necessary for transmitting a signal that may become a bottleneck is set to the offset time, an offset time of the same value is also used for another signal, and output of the signal is waited in line with the output time of the signal that may become a bottleneck. A specific example will be described below.

It is assumed that the processing time of the transmission server 1 for a control signal is "100 msec", the network delay is "100 msec", and the processing time by the reception server 2 is "50 msec". Meanwhile, it is assumed that the processing time of the transmission server 3 for a video and audio signal is "300 msec", the network delay is "100 msec", and the processing time by the reception server 4 is "300 msec".

In this case, the video and audio signal is the bottleneck. Further, as the offset time, 700 msec are required at minimum. In consideration of processing delay and fluctuation in the network delay, in order to realize stable operation, a period of time (for example, 1000 msec) obtained by adding a predetermined period of time (for example, 300 msec) to 700 msec is set as the offset time.

In the case where 1000 msec is set as the offset time, after the preparation for transmitting the video and audio signal is made, the reception server 4 for the video and audio signal waits for about 300 msec, and then transmits the video and audio signal at the output time. In the reception server 2 for the control signal, after preparation for transmitting the control signal has been made, the reception server 2 waits for about 750 msec and transmits the control signal at the output time.

The reception server 2 illustrated includes a reception unit 21, an adjustment unit 22, and an output control unit 23. The reception unit 21 receives a control signal to which the output time is appended from the transmission server 1.

The adjustment unit 22 may adjust the control signal received by the reception unit 21 in order to enhance the realistic feeling in the live viewing site. The adjustment unit 22 may adjust the content of the control signal. Specifically, the transmission server 1 transmits facility information of the concert site (size of the site, types and arrangement information of lighting devices) to the reception server 2 together with the control signal. In the live viewing site, the adjustment unit 22 of the reception device 2 uses the facility information of the concert site to adjust the received control signal according to the lighting devices of the live viewing site.

For example, the adjustment unit 22 may change the angle of operating the moving light according to the live viewing site and adjust the operation start and end timing along with it. The adjustment unit 22 may also adjust the control content of the control signal by using a conversion table or the like for absorbing the difference in the type and arrangement of the lighting devices. For example, in the case of a control signal to designate the angle of operating the lighting device, the designated angel may not be suitable depending on the size of the live viewing site, the installation method of the lighting device, and the like. Therefore, it is necessary to change the angle according to the specification of the live viewing site. In that case, the adjustment unit 22 converts the angle designated by the control signal of the concert site into a value defined by a conversion table or the like.

Further, the adjustment unit 22 may output the time information of a video frame and the time information of a control signal by strictly synchronizing them. For example, there is a possibility that while the video has video frames of certain intervals (when 60 fps, intervals of about 16.7 msec), control signals do not strictly synchronize with the intervals. In the case where the transmission interval corresponding to the frame rate differs between the video and audio signal and the control signal, or in the case where the timing is different even though the transmission intervals are the same, the adjustment unit 22 may correct or complement the control signal by linear compliment or the like such that the control signal whose timing differs from the original timing is naturally output at the timing of the frame rate of the video.

Note that the adjustment of a control signal by the adjustment unit 22 of the reception server 2 may be performed by the adjustment unit 12 of the transmission server 1.

The output control unit 23 outputs a control signal to the lighting device 6 in the live viewing site at the output time and allows the control of the lighting device 6 to synchronize with at least one of the video and the audio to be played in the live viewing site.

The synchronous control system includes the transmission server 3 and the reception server 4 that transmit and receive a video and audio signal. The transmission server 3 is provided in the concert site and the reception server 4 is provided in the live viewing site. After the transmission server 3 receives a video and audio signal input from the camera unit 8, the transmission server 3 obtains the receipt time at which the signal is received, calculates the output time by adding the offset time to the receipt time, and transmits the video and audio signal to which the output time is appended to the reception server 4 of the live viewing site.

The reception server 4 receives the video and audio signal to which the output time is appended and outputs the video and audio signal to a presentation system device 9 in the live viewing site at the output time. The presentation system device 9 is a device that outputs (plays) the video and audio signal in the live viewing site. Specifically, the presentation system device 9 shows the video of the video and audio signal on a display and outputs the audio.

Operations of the transmission server 1 and the reception server 2 of the present embodiment will be described below.

Figure 3:
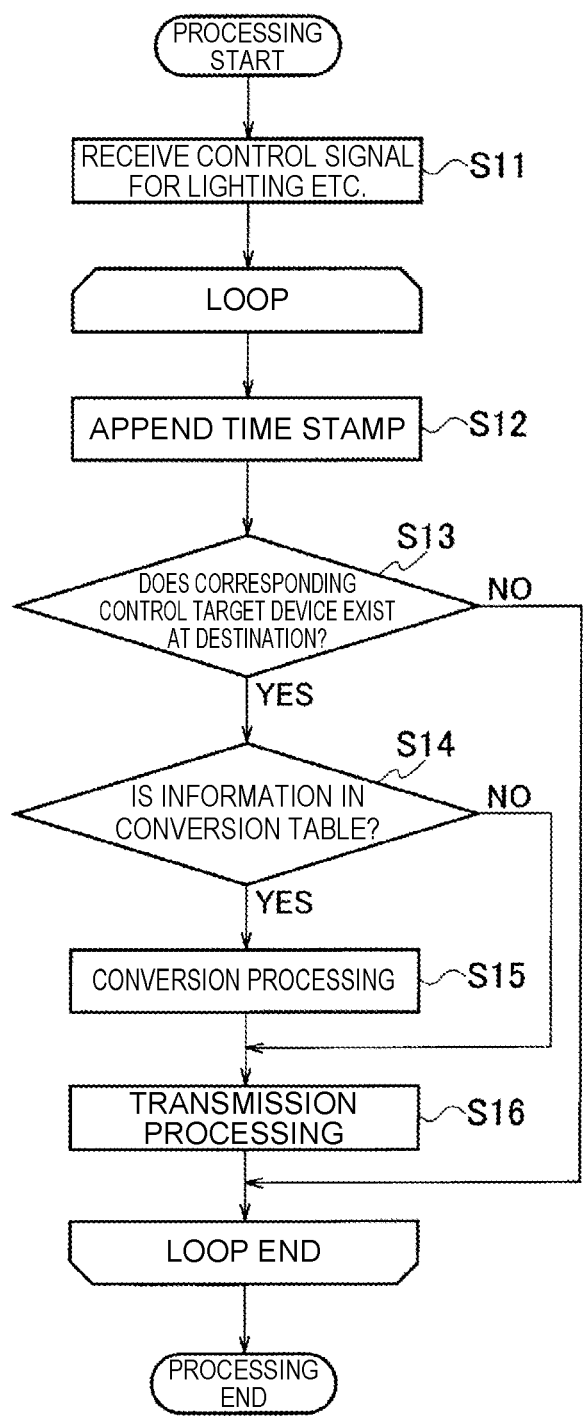
FIG. 3 is a flowchart illustrating an operation of a transmission server.

FIG. 3 is a flowchart illustrating an operation of a transmission server 1. The transmission server 1 receives a control signal from the lighting control device 5 (S11). If control signals for a plurality of lighting devices are included in the received control signal, the transmission server 1 repeats the processing of S12 to S16 for each lighting device.

The transmission server 1 appends, to the control information, the output time (time stamp) obtained by adding the offset time to the receipt time at which the control signal is received (S12). The transmission server 1 determines whether there is a lighting device corresponding to the received control signal in the live viewing site that is the transmission destination (S13). If there is no corresponding lighting device (S13: NO), the transmission server 1 discards the control signal. The process returns to S12 and the transmission server 1 performs the processing on the next control signal. That is, the transmission server 1 filters the control signal.

Alternatively, suppose that there is a corresponding lighting device (S13: YES). In the above case, if there is a conversion table corresponding to the control signal (S14: YES), the transmission server 1 converts (adjusts) the control signal according to the facility of the live viewing site (S15). If there is no conversion table (S14: NO), the process of the transmission server 1 proceeds to S16. Note that the conversion at S15 may be performed by the reception server 2. The transmission server 1 transmits the control information to which the output time (time stamp) is appended to the reception server (S16).

Figure 4:
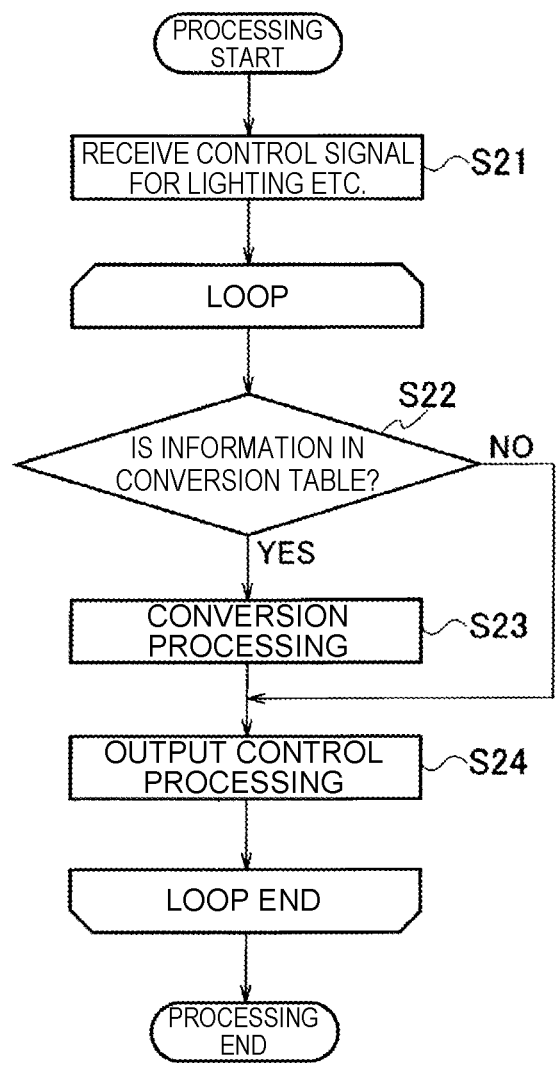
FIG. 4 is a flowchart illustrating an operation of a reception server.

FIG. 4 is a flowchart illustrating an operation of the reception server 2. The reception server 2 receives a control signal from the transmission server 1 (S21). If control signals for a plurality of lighting devices are included in the received control signal, the reception server 2 repeats the processing of S22 to S24 for each lighting device.

If there is a conversion table corresponding to the control signal (S22: YES), the reception server 2 converts (adjusts) the control signal according to the facility of the live viewing site (S23). Note that the conversion at S23 may be performed by the transmission server 1. If there is no conversion table (S22: NO), the process of the reception server 2 proceeds to S24. The reception server 2 outputs the control signal to which the output time is appended to the lighting device at the output time (S24).

Figure 5:
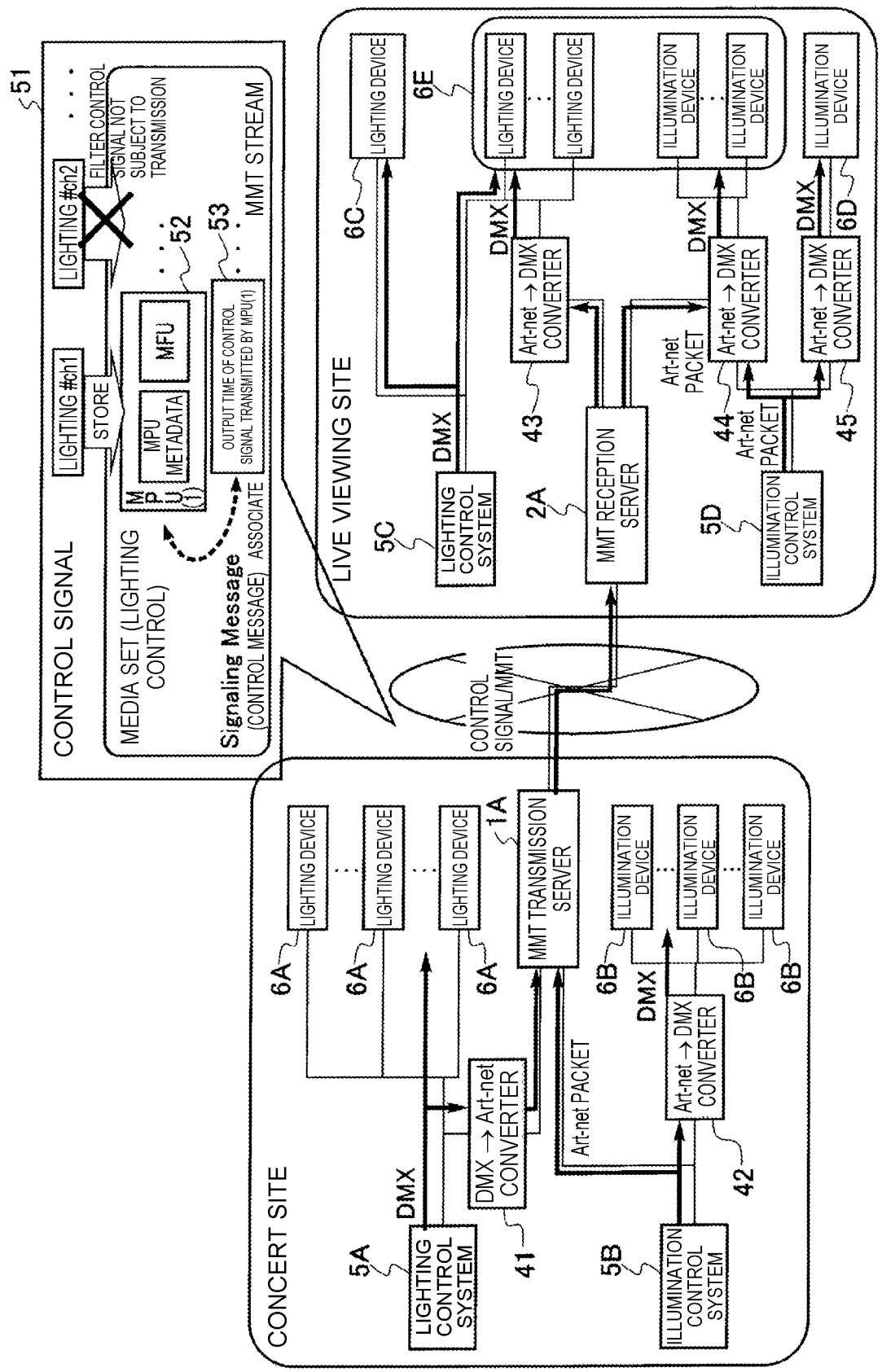
FIG. 5 is a configuration diagram illustrating an example of a synchronous control system.

FIG. 5 is a system configuration diagram illustrating examples of the transmission server 1 and the reception server 2 of the synchronous control system of the present embodiment. In the example illustrated, the live video of the concert site is to be played in the live viewing site. At that time, as similar to the concert site, lighting is changed in synchronization with the video and the audio to be played in the live viewing site.

A lighting control system 5A of the concert site transmits a DMX signal (a control signal) to a lighting device 6A to control the lighting device 6A and transmits the DMX signal to a converter 41. The converter 41 converts the DMX signal (a digital signal) into an Art-net packet so as to be transmittable/receivable on the IP network, and transmits the Art-net packet to an MMT transmission server 1A.

An illumination control system 5B transmits the Art-net packet (a control signal) to a converter 42 and also to an MMT transmission server 1A. The converter 42 converts the Art-net packet to a DMX signal, and transmits the DMX signal to an illumination device 6B to control an illumination device 6B.

The MMT transmission server 1A generates an MMT packet by appending the output time obtained by adding the offset time to the received Art-net packet (a control signal). In the MMT stream 51 illustrated in FIG. 5, control data of the Art-net packet is stored in an MPU 52 as a media set and the output time of the MPU 52 is stored in a signaling message (a control message) 53. The MPU 52 and the signaling message 53 are associated with each other. The MPU 52 and the associated signaling message 53 are transmitted as an MMP packet.

The Media Processing Unit (MPU) 52 is a unit that can perform data decryption processing alone. The MPU 52 includes MPU metadata and a Media Fragment Unit (MFU). MFU is a unit smaller than the MPU 52.

Further, the illustrated MMT stream 51 shows a state where an MMT transmission server 1A discards (filters) a control signal of a lighting device (lighting #ch2) not existing in the live viewing site.

In the live viewing site, an MMT reception server 2A outputs an Art-net packet (a control signal) of the received MMT packet to converters 43 and 44 at the output time set in the signaling message. If the control signal is for a lighting device, the MMT reception server 2A outputs the control signal to the converter 43 for lighting. If the control signal is for an illumination device, the MMT reception server 2A outputs the control signal to the converter 44 for illumination. The converter 43 or 44 converts the Art-net packet to a DMX signal and transmits the DMX signal to the lighting device or the illumination device to control a lighting device 6E or an illumination device 6E. Here, the lighting device 6E and the illumination device 6E are devices corresponding to the lighting device 6A and the illumination device 6B in the concert site.

Further, the live viewing site has a lighting device 6C and an illumination device 6D that are provided only in the live viewing site, and also a lighting control system 5C and an illumination control system 5D that control the devices 6C and 6D respectively. The lighting control system 5C may control not only the lighting device 6C unique to the live viewing site but also the lighting device 6E corresponding to the concert site.

Similarly, the illumination control system 5D may control not only the illumination device 6D unique to the live viewing site but also the illumination device 6E corresponding to the concert site. Specifically, the illumination control system 5D may output the Art-net packet not only to the converter 45 but also to the converter 44. The converter 45 converts the Art-net packet to a DMX signal and transmits the DMX signal to the illumination device 6D unique to the live viewing site to control the illumination device 6D.

Figure 6:
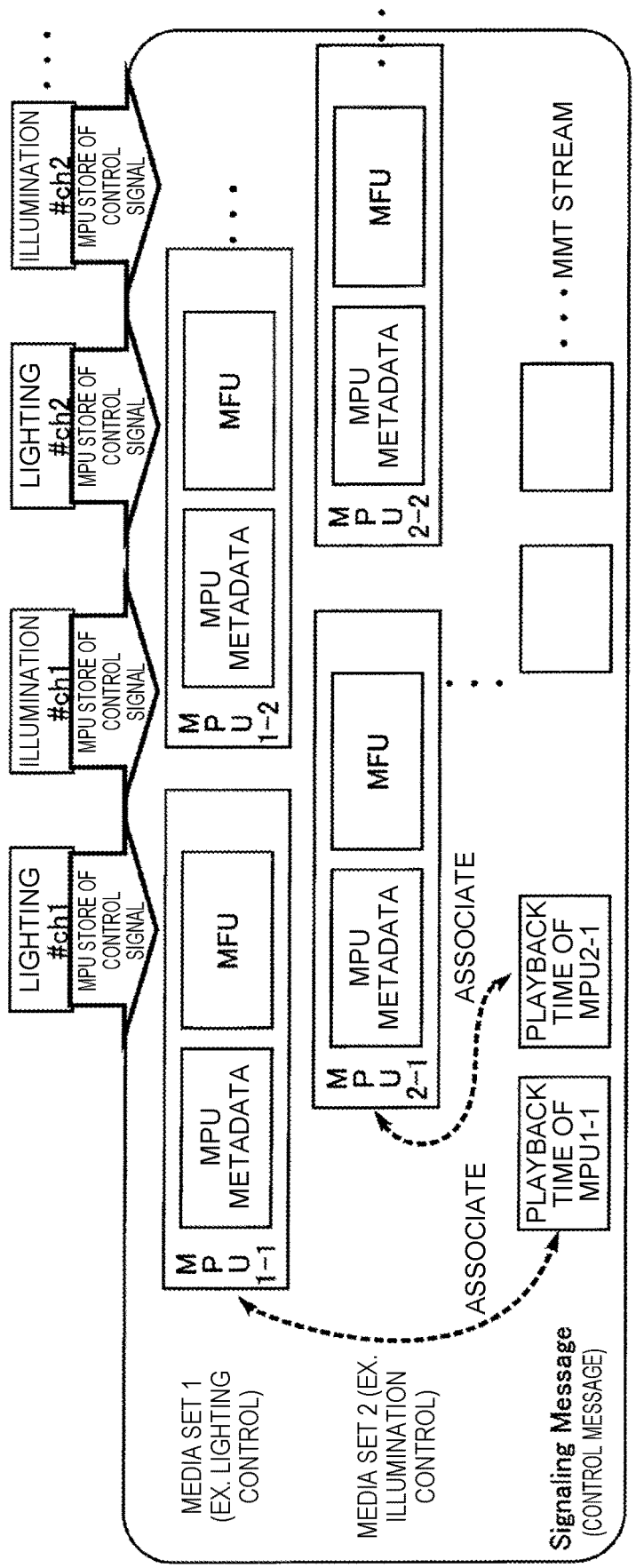
FIG. 6 illustrates an example of an MMT stream.

FIG. 6 illustrates an example of an MMT stream. In the MMT stream illustrated, control signals of two media sets are transmitted as MMT packets. Here, MMT packets of a media set 1 of a lighting control system that controls lighting and a media set 2 of an illumination control system that controls illumination are illustrated.

The synchronous control system of the present embodiment described above includes a transmission server and a reception server. The transmission server includes a reception unit that receives a control signal of a lighting device for a live event site and a transmission unit that transmits, to the reception device in the live viewing site, the control signal to which an output time is appended. The output time is obtained by adding a predetermined period of time to the receipt time at which the control signal is received. The reception server includes a reception unit that receives the control signal to which the output time is appended and an output control unit that outputs the control signal to a lighting device in the live viewing site at the output time and allows the control of the lighting device to synchronize with at least one of video and audio to be played in the live viewing site.

Accordingly, in the present embodiment, in the live viewing site, at least one of the video and audio and the lighting are synchronized with each other as similar to the live event site. That is, in the present embodiment, by appending an output time obtained by adding a predetermined period of time (an offset time) to the receipt time of the control signal, it is possible to allow the video or the like and the lighting to synchronize with each other in the live viewing site even if there is a difference in the signal processing delay and a network delay difference between the video and audio signal and the control signal. Therefore, in the present embodiment, live viewing giving a realistic feeling can be realized.

Further, the transmission server of the present embodiment includes an adjustment unit that discards a control signal of a lighting device not existing in the live viewing site. Thereby, transmission of an unnecessary control signal is prevented, so that the network load can be reduced.

Further, the reception server 2 of the present embodiment includes an adjustment unit that adjusts the received control signal in accordance with the lighting device in the live viewing site by using facility information of the live event site. This can enhance the realistic feeling in the live viewing site.

Figure 7:
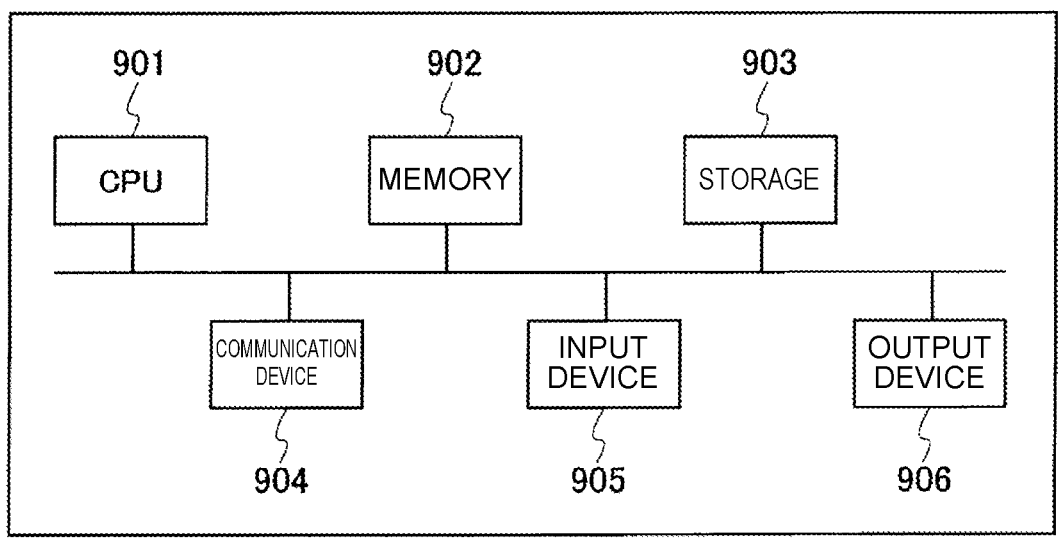
FIG. 7 is an example of a hardware configuration.

As each of the transmission server 1 and the reception server 2 described above, a general-purpose computer system as illustrated in FIG. 7 can be used, for example. The computer system illustrated has a central processing unit (CPU, processor) 901, a memory 902, storages 903 (hard disk drive: HDD, solid state drive: SSD), a communication device 904, an input device 905, and an output device 906. The memory 902 and the storage 903 are storage devices. In this computer system, the CPU 901 executes a given program loaded on the memory 902, whereby the function of each device is realized. For example, the function of each of the transmission server 1 and the reception server 2 is realized by, in the case of the program for the transmission server 1, execution of the program by the CPU of the transmission server 1, and in the case of the program for the reception server 2, execution of the program by the CPU of the reception server 2.

Further, the transmission server 1 and the reception server 2 may be mounted on one computer or on a plurality of computers. Further, the reception server 2 and the reception server 2 may be virtual machines mounted on a computer.

The program for the transmission server 1 and the program for the reception server 2 may be stored on a computer-readable storage medium such as a HDD, a SSD, a Universal Serial Bus (USB) memory, a Compact Disc (CD), and a Digital Versatile Disc (DVD) or distributed via a network.

Note that the present invention is not limited to the embodiment described above and the modifications. Various modifications can be made within the scope of the gist thereof. For example, in a mode for carrying out live viewing, it is possible to register a lighting control program similar to that of the concert site in a control table or the like provided to the live viewing site in advance, and execute the lighting control program in synchronization with the video instead of n transmitting a control signal of the concert site or an adjusted control signal. In that case, by outputting a control signal serving as a trigger for executing the lighting control program in synchronization with the video by using the technology of the present embodiment, it is possible to realize live viewing that gives a realistic feeling.

That is, if there is a machine that can generate the same signals in the concert site and the live viewing site, it is possible to realize synchronous control similar to that of the present embodiment even if a control signal is not transmitted to a remote live viewing site.

In general, for lighting control, a lighting device is automatically controlled through execution, by a control table, of a program for lighting control registered in advance in the control table (machine). Therefore, if the same control tables and the programs are provided in a concert cite and a live viewing site, there is no need to transmit a control signal. In that case, in order to allow the execution timing of the program to synchronize with the video, a signal serving as a trigger for executing the program in synchronization with the video is transmitted from the transmission server 1 of the concert site to the reception server 2 of the live viewing site.

In that case, the control table in the concert site transmits an initiation signal to the transmission server 1 at the timing of initiating execution of the program. After the transmission server 1 receives the initiation signal, the transmission server 1 appends the output time which is obtained by adding the offset time to the receipt time to the initiation signal and transmits the initiation signal to the reception server 2 of the live viewing site. The reception server 2 outputs the initiation signal to the control table in the live viewing site at the appended output time. The control table uses the input of the initiation signal as an execution trigger of the program. Accordingly, the lighting can be controlled in synchronization with the video.

REFERENCE SIGNS LIST

1 Transmission server (transmission device)
11 Reception unit
12 Adjustment unit
13 Transmission unit
2 Reception server (reception device)
21 Reception unit
22 Adjustment unit
23 Output control unit
5 Lighting control device
6 Lighting device

The invention claimed is:

1. A synchronous control system comprising a transmission device and a reception device, wherein
the transmission device includes:
a reception unit, including one or more processors, configured to receive a control signal for a lighting device in a live event site; and
a transmission unit, including one or more processors, configured to add, to the control signal, an output time obtained by adding a predetermined time to a receipt time at which the control signal is received and transmits the control signal to the reception device in a live viewing site, and
the reception device includes:
a reception unit, including one or more processors, configured to receive the control signal to which the output time is appended; and
an output control unit, including one or more processors, configured to output the control signal to a lighting device in the live viewing site at the output time.

2. The synchronous control system according to claim 1, wherein
the transmission device includes
an adjustment unit, including one or more processors, configured to discard a control signal for a lighting device not existing in the live viewing site.

3. The synchronous control system according to claim 1, wherein
the reception device includes an adjustment unit, including one or more processors, configured to adjust the control signal received according to the lighting device in the live viewing site by using facility information of the live event site.

4. A transmission device in a synchronous control system including the transmission device in a live event site and a reception device in a live viewing site, the transmission device comprising:
a reception unit, including one or more processors, configured to receive a control signal for a lighting device in the live event site; and
a transmission unit, including one or more processors, configured to add, to the control signal, an output time obtained by adding a predetermined time to a receipt time at which the control signal is received and transmit the control signal to the reception device in the live viewing site.

5. A non-transitory computer-readable storage medium storing a synchronous control program for causing a computer to function as the transmission device according to claim 4.

6. A reception device in a synchronous control system including a transmission device in a live event site and the reception device in a live viewing site, the reception device comprising:
a reception unit, including one or more processors, configured to receive a control signal, to which an output time is appended, transmitted by the transmission device, the output time being obtained by adding a predetermined period of time to a receipt time of the control signal for a lighting device in the live event site; and
an output control unit, including one or more processors, configured to output the control signal to a lighting device in the live viewing site at the output time.

7. A non-transitory computer-readable storage medium storing a synchronous control program for causing a computer to function as the reception device according to claim 6.

8. A synchronous control method to be performed by a synchronous control system including a transmission device and a reception device, the method comprising:
by the transmission device:
receiving a control signal for a lighting device in a live event site; and
transmitting, to the reception device in a live viewing site, the control signal to which an output time is appended, the output time being obtained by adding a predetermined period of time to a receipt time at which the control signal is received, and
by the reception device:
receiving the control signal to which the output time is appended; and
outputting the control signal to a lighting device in the live viewing site at the output time.

* * * * *